Figure 1:
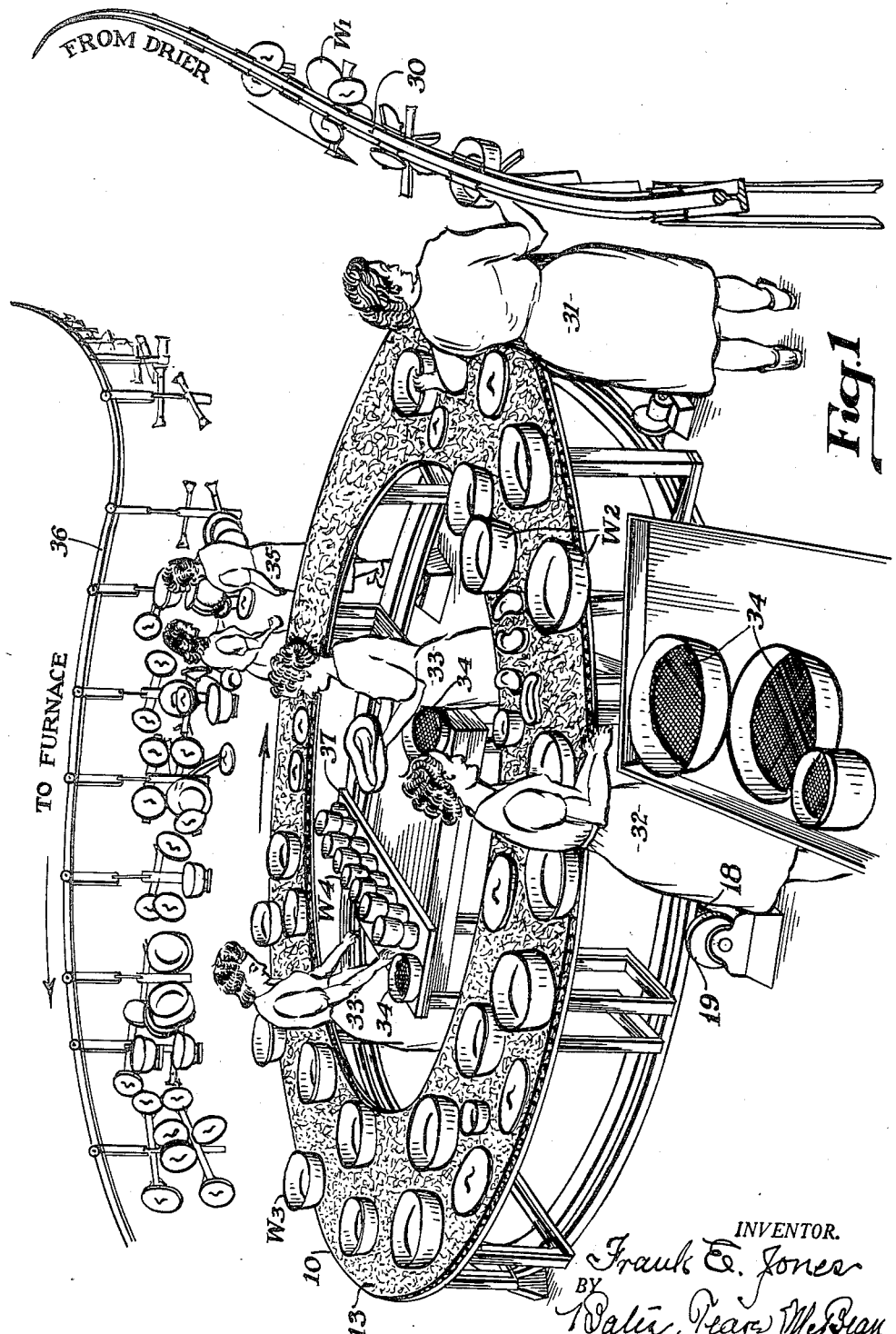

Aug. 17, 1948.         F. E. JONES              2,447,072
                       CONVEYER SYSTEM
Filed Oct. 30, 1945                        2 Sheets-Sheet 1

Aug. 17, 1948.  F. E. JONES  2,447,072
CONVEYER SYSTEM
Filed Oct. 30, 1945  2 Sheets-Sheet 2

INVENTOR.
Frank E. Jones,
BY
Bates, Teare & McBean,
Attorneys.

Patented Aug. 17, 1948

2,447,072

UNITED STATES PATENT OFFICE 2,447,072

CONVEYER SYSTEM

Frank E. Jones, West Lafayette, Ohio, assignor to The Jones Metal Products Company, West Lafayette, Ohio, a corporation of Ohio Application October 30, 1945, Serial No. 625,641

1 Claim. (Cl. 311—32)

This invention relates to a conveying system wherein goods are interchanged between conveyors with provision for treatment thereof during the interchange. Such a system is very useful, for instance, in connection with the manufacture of enamelware.

In the manufacture of enamelware, the metal forms for the pans, cups, lids, and the like are uniformly covered with the slip or raw enameling material by dipping or spraying. The articles are then placed on a conveyor chain which carries them through a drier. On emerging from the drier, the material is in a dry and somewhat chalky or spongy condition, and, when the articles are subsequently placed upon a conveyor and passed through a furnace, the coating is fired to the durable, glassy finish familiar on enamelware.

Additional operations, however, are required upon the ware besides these primary ones as the articles coming from the drier are seldom in a desired condition for the final firing. The material, being fluid or semi-fluid at the start, tends to run thin at some points and to collect at others before it is completely dry. This necessitates examination of each piece and additionally an operation known as beading in which an operator applies, usually with her fingers, additional material to the sponged off areas. Because of the delicate nature of the coating, and consequently the care with which the ware must be handled, stacking or telescoping of the articles is not permissible, and the beading operation has always taken a disproportionate share of the floor space.

A frequent custom has been to employ long boards for transporting the ware from one point to another. An operator removed the ware from the drier chain and placed the various pieces upon a board resting on a suitable support. When the board was filled, it was placed upon a wheeled rack. Other boards were then loaded in a similar fashion and placed on the rack. When this rack was filled, it was rolled to one of a number of beader's tables where the beading operator removed a board to her table and there performed the necessary operation to place the ware in condition for the furnace. The ware was then carefully placed on suitable supporting boards which were put in a wheeled rack and taken to a conveyor chain leading to the furnace and the individual pieces of ware transferred to such chain. Due to this great amount of handling, which with variations has always been necessary, much attendant scarring and dropping of the delicate pieces has resulted as well as a great loss of time.

An object of the present invention is to provide a device which will allow movement of the articles from the drier to the beader, and from the beader to the furnace, in an efficient, safe, and expeditious manner.

Another object is to provide such a device which will be compact in form and hence require a minimum amount of floor space and which will allow the operators to remain at fixed positions and hence perform a maximum amount of useful work.

A further object is to provide such a device which will be simple in design and require a comparatively small amount of motive power and hence will be economical in manufacture and use.

Figure 2:
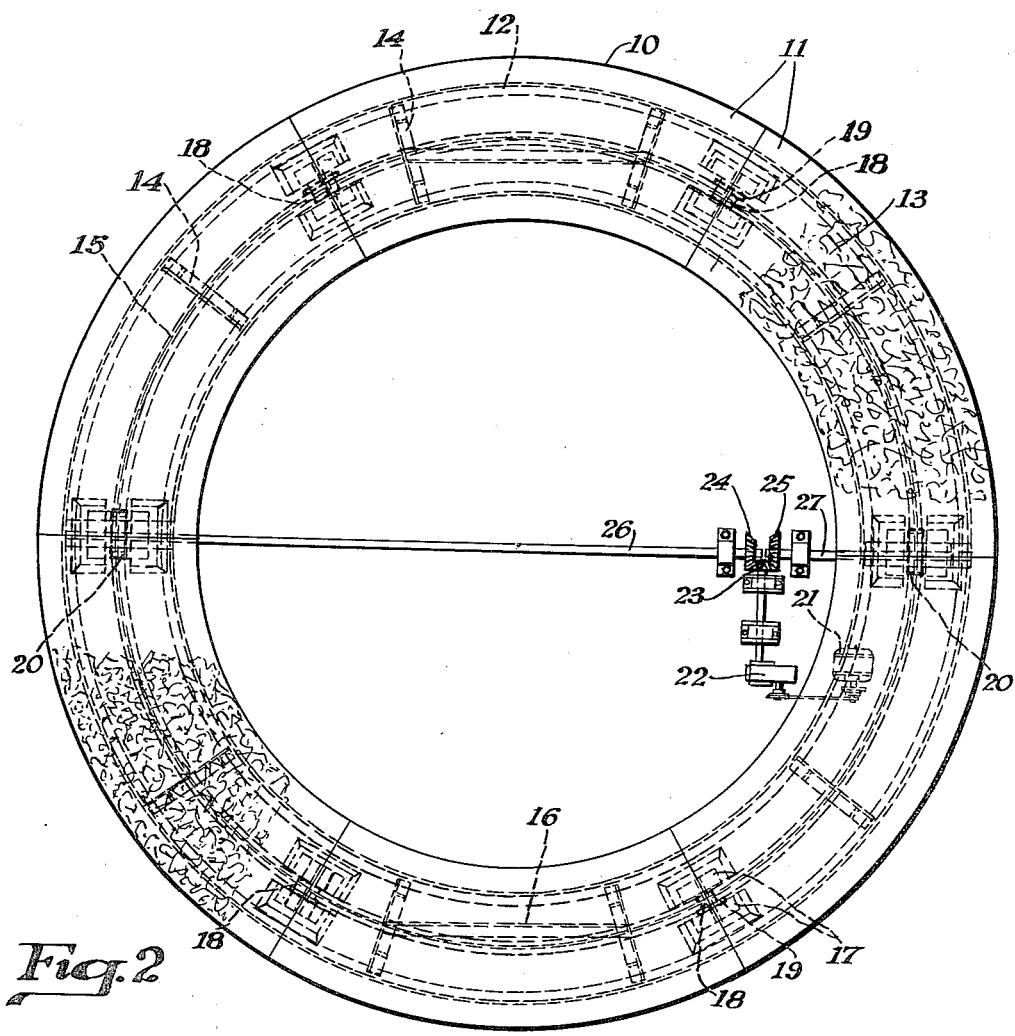
Figure 3:
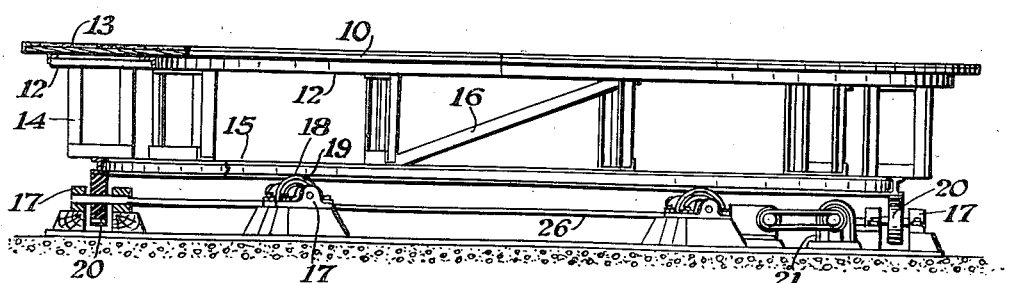

Referring now to the drawings, Fig. 1 is a perspective view illustrating the device of my invention in use; Fig. 2 is a plan view of the device alone; and Fig. 3 is a side elevation thereof.

As illustrated in the drawings, the device of my invention is in the form of an annular table supported on a series of rollers, the bearings of which are fixed to the floor. In the simple and preferred form illustrated, the flat table top 10 comprises a series of sections 11, of wood or metal, secured to an angle iron framework 12. The upper surface of the table is covered with a layer 13 of resilient material such as felt, to form a cushioned support for the ware.

The angle iron framework 12 is supported on a series of bents 14 which, in turn, are supported on an annular rail 15 preferably of I-beam construction. The members 11, 12, 14 and 15 are riveted, welded or otherwise securely attached to form a rigid structure, and additional bracing, as at 16, may be employed.

The rail 15 rides on a series of rollers carried by anti-friction bearings 17 mounted on the floor. The rollers 18 are provided with outside flanges 19 to prevent lateral creep of the table, while other rollers 20 are provided with rubber tires for good driving engagement with the rail and are motor driven. As best seen in Fig. 2, a motor 21, through a speed reducer 22, drives a bevel pinion 23 which meshes with bevel gears 24 and 25 secured to shafts 26 and 27 respectively. The rollers 20 are drivingly secured to the outer ends of the shafts and are driven in the proper directions, by means of the bevel gearing, to rotate the table.

A conveyor as described is illustrated in operation in Fig. 1. As there shown, it is interposed between the conveyors from the drier and to the furnace to allow and facilitate the beading operation. The ware W¹ emerges from the drier, not shown, on the conveyor 30. The table 10 is so placed relative to the conveyor that an operator at 31 may easily remove the ware from the conveyor and place it upon the table. The table is continuously revolved by means of the motor, as described, and its linear speed is so regulated with respect to that of the conveyor 30 that the operator 31 may at all times find available space on the table for the ware as it is delivered to her.

The slip or raw enameling material on the articles is at this time in a dry but delicate condition. It may be handled with impunity if due care is observed but is easily scarred upon contact with hard or sharp surfaces. The layer of felt 13 on the table provides a soft and resilient surface upon which to put the articles and hence reduces the likelihood of scarring to a minimum.

As the open-centered table revolves in the clockwise direction indicated, the ware W² is delivered to the beading operators 32 and 33 on the outside and inside of the table respectively. These operators examine the articles as they approach them and perform the necessary or repairing operations thereon. The coating material is at this time still in a workable condition and, where it has run thin, more may be applied from the operator's pans 34, and where it has collected, it can be made smooth or removed. Preferably, a thickened edge or bead is applied to the open rims of the articles to provide a more durable product. On many pieces the beading operation can be performed without lifting the article from the felt top, lessening possibility of damage.

It will be noted that the open center of the annular table enables one or more operators to work therein simultaneously with one or more at the outer rim of the table. Best advantage may thus be taken of the device.

As the operators complete the articles they place them once more upon the table, continuous rotation of which carries the articles to the unloading position where one or more operators 35 remove them from the table and place them upon the furnace conveyor 36 by which they are conveyed to the final firing operation, not shown. An alternative operation of the device is illustrated by one of the operators 33 who has taken a number of articles W⁴ from the conveyor and placed them upon an auxiliary table 37, there to perform some special or more time-consuming operation upon them. When completed they are placed once more upon the rotating table and are transported to the unloading position.

It will be noted that while I have shown a particular form of my device, numerous modifications may be made in the constructional details thereof without departing from the spirit and scope of my invention.

I claim:

A transferring and working support comprising a series of rollers mounted in a circular course on a floor, a rotatable device comprising an annular track riding on said rollers, a flat annular table above the track for material to be treated, a series of spaced uprights between the track and annular table for supporting the table, allowing access to the space on the interior of the table, and means for rotating the table, the top of said table being at such elevation with reference to the floor on the exterior and interior thereof that operators standing on the floor may readily place goods on the table or remove them therefrom.

FRANK E. JONES.

REFERENCES CITED

The following references are of record in the file of this patent:

UNITED STATES PATENTS

| Number | Name | Date |
|---|---|---|
| 490,286 | Hollowell | Jan. 24, 1893 |
| 1,204,428 | Grandfield | Nov. 14, 1916 |
| 1,422,057 | Hooper | July 4, 1922 |
| 1,468,247 | Patten | Sept. 18, 1923 |
| 1,553,528 | Hartong | Sept. 15, 1925 |
| 1,635,334 | Mitchell | July 12, 1927 |
| 2,082,236 | Anderson | June 1, 1937 |